Figure 1:
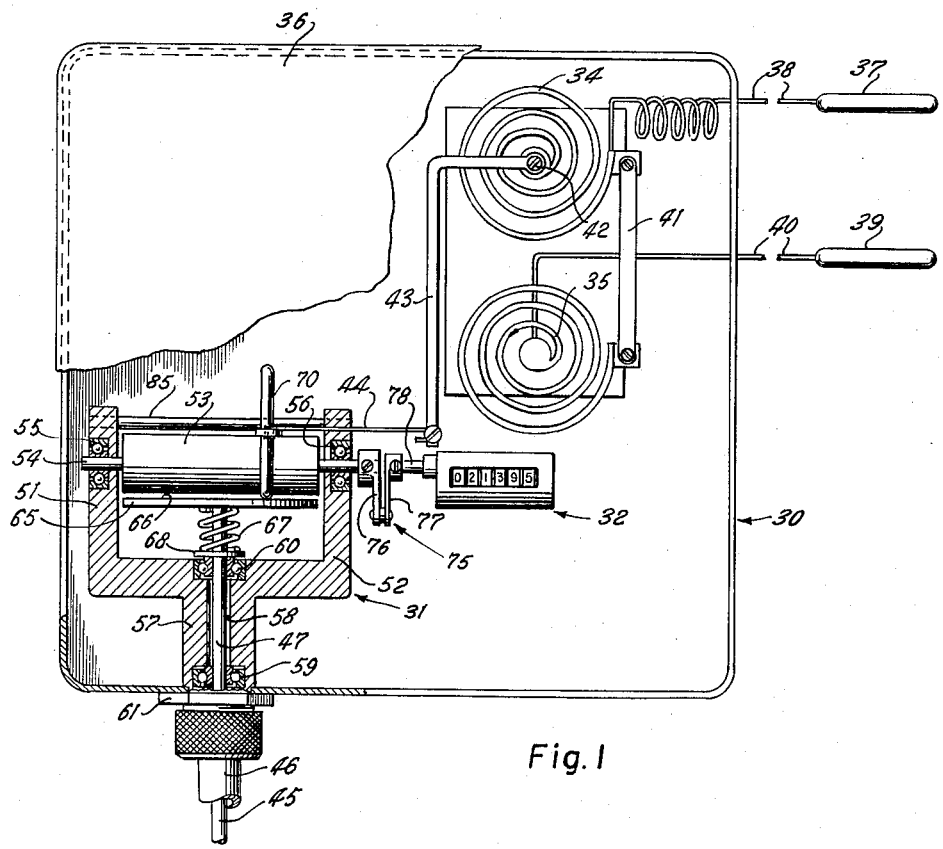

June 9, 1959

C. W. PARISH ET AL
ADJUSTABLE VARIABLE SPEED, POWER AND
MOTION TRANSMISSION DEVICES 2,889,713

Filed Nov. 14, 1955

3 Sheets-Sheet 1

INVENTORS
Stanley V. Preskitt
Charles W. Parish

BY *Hastings Ashley*

ATTORNEY

June 9, 1959

C. W. PARISH ET AL 2,889,713

ADJUSTABLE VARIABLE SPEED, POWER AND
MOTION TRANSMISSION DEVICES

Filed Nov. 14, 1955

3 Sheets-Sheet 2

INVENTORS
Stanley V. Preskitt
Charles W. Parish

BY *Hastings Ashley*

ATTORNEY

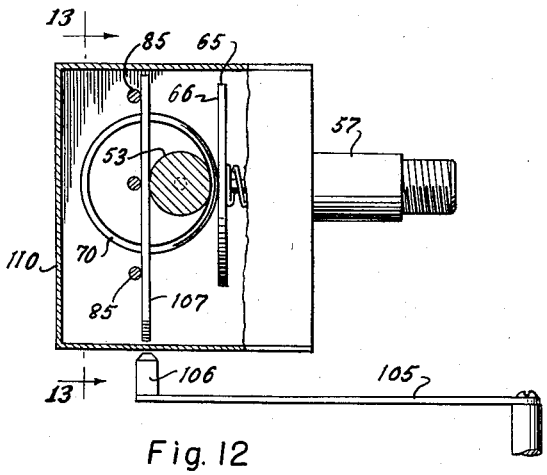
Fig. 12
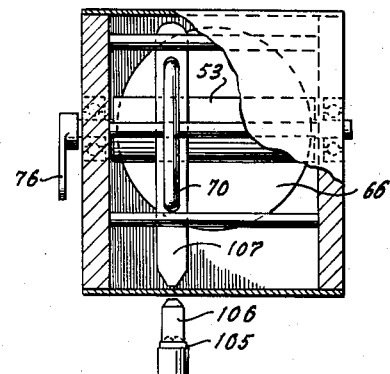
Fig. 13
     
Fig.14  Fig.15  Fig.16  Fig.17  Fig.18  Fig.19
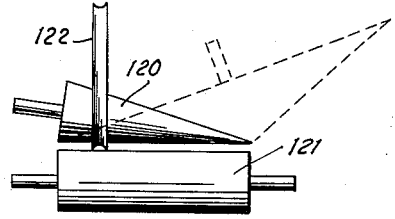
Fig. 20
    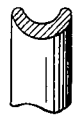
Fig. 21   Fig.22  Fig.23
INVENTORS
Stanley V. Preskitt
Charles W. Parish
BY
ATTORNEY

United States Patent Office 2,889,713
Patented June 9, 1959

2,889,713

ADJUSTABLE VARIABLE SPEED, POWER, AND MOTION TRANSMISSION DEVICES

Charles W. Parish and Stanley V. Preskitt, Dallas, Tex., assignors, by mesne assignments, to American Meter Company, Philadelphia, Pa.

Application November 14, 1955, Serial No. 546,415

3 Claims. (Cl. 74—190)

This invention relates to new and improved adjustable variable speed, power and motion transmission devices.

One object of the invention is to provide for means of transmitting speed, power or motion from a driving member to a driven member through an infinite number of drive ratios by adjustable means incorporated and interposed between said members; and which may be used as a mechanical means of multiplying and dividing.

Another object of the invention is to provide a device which will integrate the power, speed, or motion of a variable input or driving member in direct proportion to the sum total of the input.

An important object of the invention is to provide a mechanical means of continuous integration of two variables, where one variable input is in a rotary form of motion, such as the output of a rotating vane water meter, or an electrical clock motor, and the other variable is in the form of an angular or linear displacement; and, it is particularly important to provide such integrator means which can be made to perform properly where the angular or linear displacement variable is effected by extremely small forces, such as the angular displacement of a temperature or pressure spiral used in industrial recording and controlling equipment.

A further object of the invention is to provide a means for mechanically totalizing or integrating the quantity of a thing or substance measured at an external source by an external device.

Another object of the invention is to provide a variable transmission device which is adapted to be sealed off from exposure to dust, corrosions, etc., to prevent deterioration or contamination of the moving parts.

Another object of the invention is to provide an improved and simplified B.t.u. meter for measuring the quantity of heating or cooling medium delivered to and used in each of several segregated areas.

A particular object of the invention is to provide a means of metering the amount of cooling consumed in any given area, such as in cooling systems which circulate chilled water or liquid, extracting heat from the area, and returning the warmed liquid to a central cooling unit for rechilling; the measurements taken being the entrance temperature, the exit temperature, and quantity of liquid flowing, and the quantities so measured being totalized and indicated on a standard counter which may be read in B.t.u.'s or tons of refrigeration.

It is similarly an object of the invention to provide a means for measuring the amount of heat used in heating one or more given areas when each of these areas receive their heat from a central heating unit, and wherein the temperatures of the heating fluid going to and returning from the heated area and the quantity of heating fluid are measured, with all quantities being totalized and indicated by a counter, or being used to regulate the flow of the heating fluid.

Another important object of the invention is to provide a means of checking or continuously monitoring the efficiency of any heat exchanger employing fluids or mediums which are in the same state, that is, liquid or gaseous on both sides of the heat exchanger; and wherein a pair of meters such as the B.t.u. meters of this invention are connected in a single unit and wherein temperatures are measured at the inlet of the input to the exchanger, the flow of fluids is measured in both input and output lines; whereby the difference in the input heating or cooling potential available and that actually exchanged in the heat exchanger is measured and properly related to indicate the actual operating efficiency of the unit.

A further important object of the invention is to provide a means of connecting an angular or linear displacement of minute force into a rotary motion of considerable force capable of doing work, said rotary motion being of a speed which is proportional to the magnitude of the displacement by the minute force.

Another object of the invention is to provide, in an adjustable variable speed, power and motion device of the character described, an indirect coupling between the adjustable means interposed between the driving and driven members and an actuating means for operating said adjustable means; such as a magnetic coupling or the like.

Additional objects and advantages of the invention will be readily apparent from the reading of the following description of a device constructed in accordance with the invention, and reference to the accompanying drawings thereof, wherein:

Figure 1 is a view partly in elevation and partly in section of a B.t.u. meter incorporating temperature sensing devices and one form of an adjustable variable motion transmission device of the invention, showing the same enclosed in a case and adapted to be connected to a flow meter, such as a standard water meter.

Figure 2:
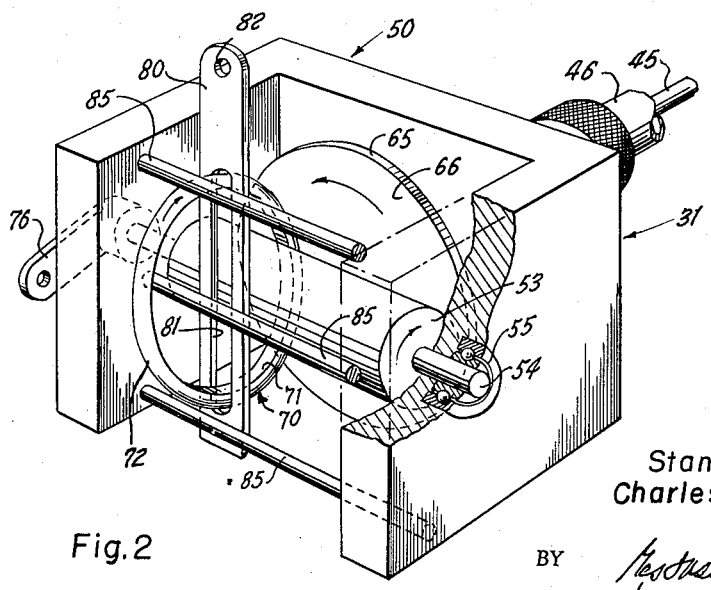
Figure 4:
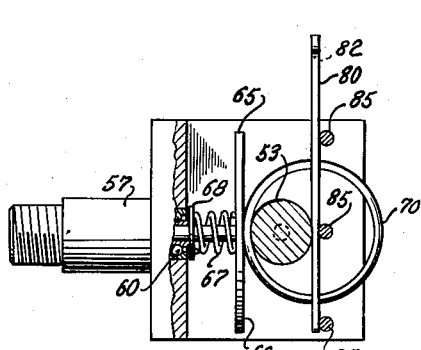
Figure 3:
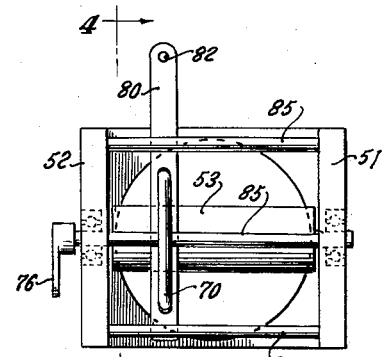
Figure 5:
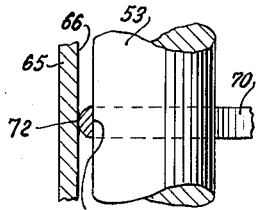
Figure 6:
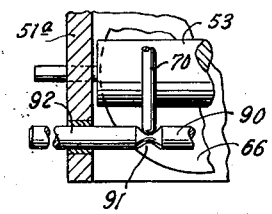
Figure 7:
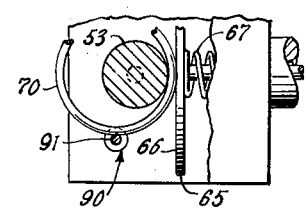

Figure 2 is an enlarged perspective view, partly in section, of the variable speed, power and motion device of Figure 1, Figure 3 is a front elevational view of the device of Figure 2, Figure 4 is a view, partly in elevation and partly in section, taken along the line 4—4 of Figure 3, Figure 5 is an enlarged fragmentary sectional view of the cylinder, disc and ring of Figure 2, Figure 6 is a fragmentary view, partly in elevation and partly in section, illustrating a modified form of actuating means for the adjustable means, Figure 7 is a fragmentary view, partly in elevation and partly in section, taken at right angles to the view of Figure 6.

Figure 8:
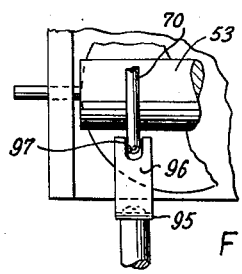
Figure 9:
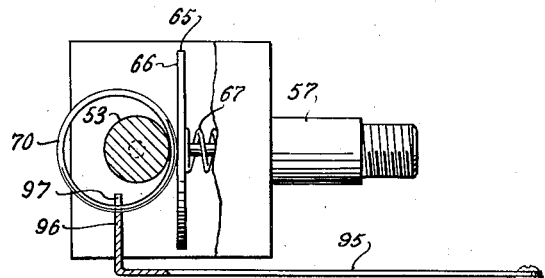
Figure 10:
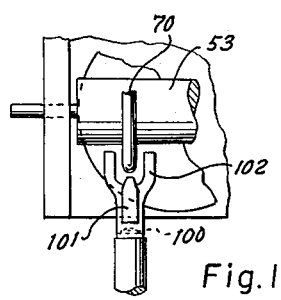
Figure 11:
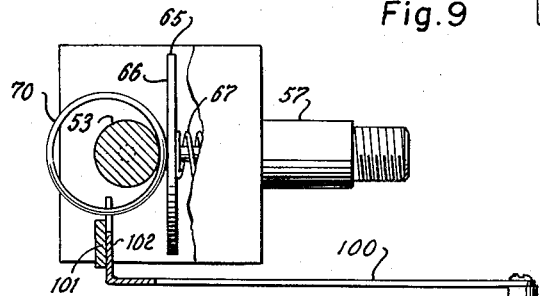

Figure 8 is a fragmentary elevational view of another modified form of the invention showing a slightly different form of actuating means, Figure 9 is a view, partly in elevation and partly in section, taken at right angles to Figure 8, Figures 10 and 11 are views similar to Figures 8 and 9, showing still further modified forms of the actuating means, Figure 12 is a view, partly in elevation and partly in section, showing the variable transmission device enclosed in a sealed case and having an indirect coupling between the adjustable means and its actuator, Figure 13 is a sectional view with parts broken away, taken along the line 13—13 of Figure 12, Figures 14 through 19 are fragmentary views, partly in elevation and partly in section, illustrating various modified forms and cross-sections of adjustable means or rings for adjustably controlling the relative movement between the driving and driven members of the variable transmission device, Fig. 20 shows the ring arranged between a cylinder and a cone, Figures 21 through 23 are views, partly in elevation and partly in section, of further modified forms of adjustable rings.

In the drawings, wherein like numbers of reference indicate corresponding parts in the several figures the numeral 30 designates generally a B.t.u. meter which includes an integrator or variable transmission device 31, an indicator or totalizer 32, and temperature responsive means in the form of a pair of interconnected temperature actuated Bourdon spirals 34 and 35, all enclosed in a suitable case 36 to prevent contamination of the moving parts from external sources, and to reduce erosion, corrosion, etc., of the elements of the meter. The Bourdon spiral 34 has a temperature sensing element or bulb 37 connected to the outer end of the spiral by a conductor 38, and the spiral 35 has a similar temperature sensing element or bulb 39 connected to its inner fixed end by a conductor 40. The outer free end of the spiral 35 is connected to the outer free end of the spiral 34 by a connecting link 41, whereby movement of the free end of the spiral 35 is transmitted to the free end of the spiral 34, and the spiral 34 has its inner end rotatably mounted on a shaft 42 but rigidly connected to an elongate L-shaped operating arm 43, which is connected by an actuating link 44 to the integrator 31 for operation thereof, as will be hereinafter more fully described. A power shaft 45 is suitably releasably connected, as by an Oldham coupling or the like, to the drive shaft 47 of the integrator. A sealing sleeve and union 46 may enclose the end of the power shaft and the Oldham coupling, and provide a seal against entry of foreign matter into the case at that point. The power shaft may be turned by an ordinary water meter of the rotating vane type (not shown).

In use of the B.t.u. meter, the water meter for rotating the power shaft 45 may be connected in the conductor for a liquid cooling medium, such as refrigerated water, whereby the water passing through the meter will turn the power shaft. Also, the temperature sensing bulb 39 may be positioned in contact with the chilled water before the same is directed through a heat exchanger (not shown) used for cooling a room or other given area, and the temperature sensing bulb 37 may be connected in the return line or conductor from the heat exchanger to the cooling unit. Thus, the temperature difference sensed by the bulbs acting through the interconnected Bourdon spirals will actuate one element of the integrator 31 while the power shaft 45 from the water meter actuates another element of the integrator, so that by such actuation a reading is produced on the indicator or totalizer 32 which may be interpolated as a measured amount of cooling consumed in the room or given area over a fixed period of time.

The structures and operation of the integrator will now be more fully described. Generally, the integrator or variable transmission device 31 includes a frame 50 which may be substantially U-shaped, having a pair of parallel spaced arms 51 and 52 between which a cylindrical follower member 53 having an axial shaft 54 fixed thereto is rotatable in bearings 55 and 56 mounted in said arms. The frame is shown as having a trunk 57 provided with an axial bore 58 through which the drive shaft 47 extends and is rotatably mounted in bearings 59 and 60 disposed at opposite ends of the bore. The trunk 57 has its outer end reduced in diameter and provided with external screw threads whereby it may extend through a suitable aperture in the case and be secured to the case by means of a lock nut 61 threaded on the outer end of the body or reduced shank. The drive shaft 47 is supported by the anti-friction bearings 59 and 60 in such a manner that the shaft can not only rotate on its axis but may also slide longitudinally along its axis, being guided by the bearings in such movement.

A flat drive disc 65 is securely fixed to the end of the drive shaft 47 which projects between the arms 51 and 52 of the frame, the face 66 of said disc being disposed parallel to the cylindrical surface of the driven cylinder 53 perpendicular to the axis of the drive shaft 47. The drive shaft 47 and the shaft 54, on which the cylinder is mounted, are so disposed that their axes intersect, for a purpose which will be hereinafter more fully understood.

The diameter of the disc is at least equal to the length of the cylinder 53, but may be greater than the length of such cylinder, if desired, in order to accomplish the function of providing a desired maximum rotation during the transmission or integration process accomplished by the integrator. The disc is resiliently biased toward the driven cylinder by means of a helical compression spring 67 which encircles the drive shaft 47 and is confined between the under side of the disc and a spaced washer 68 which rides on the inner race of the bearing 60, whereby the washer is free to rotate with the shaft. Such mounting permits the spring to rotate with the disc and shaft while it biases the disc toward the cylinder.

A floating ring 70 encircles the driven cylinder 53 and rolls on the upper flat surface 66 of the disc, said ring being firmly but gently confined between the rotating disc and the cylinder. As clearly shown in Figures 2 and 5, the ring is preferably formed with a cylindrical inner surface 71 and a circular or arcuate outer surface 72, whereby the cylindrical inner surface 71 rides on the driven cylinder 53 and the arcuate outer surface 72 rolls on the flat surface 66 of the disc. The engagement between the disc and the ring, and between the ring and the cylinder, is positively maintained by the spring 67, whereby when the disc is rotated by the drive shaft 47, the ring 70 is simultaneously rotated and by its rotation transmits corresponding movement to the driven cylinder 53. The amount of friction is determined by the force of the spring and the coefficient of friction of the materials used in the disc, ring and cylinder.

It is preferable, as has already been explained, that the cross-section of the ring be cylindrical on its inner periphery and arcuate or semi-circular on its outer periphery, whereby the ring engages the disc with substantially only a point or line contact, while the cylindrical inner periphery of the ring engages the surface of the driven cylinder 53 at at least two spaced points or lines. Thus, the ring is restrained in an upright position perpendicular to the face 66 of the disc, and since each of the elements moves with a rolling engagement with respect to the other of the elements which it contacts, the total friction loss between the driving and driven members is kept to a minimum and a higher operating efficiency is obtained than might be otherwise accomplished.

The shaft 54 carrying the driven cylinder 53 is so mounted in the bearings 55 and 56 that it rotates on its axis without any substantial longitudinal movement, and a linkage 75 is mounted on one outer end of the shaft and connects the shaft to the indicator or totalizer 32. The linkage 75 may be in the form of a crank arm 76 mounted on the end of the shaft 54 and having a sliding connection with a lever arm 77 connected to an operating shaft 78 for actuating the indicator or totalizer, whereby each rotation of the driven cylinder 53 causes a predetermined indication to be recorded on the totalizer.

Obviously, the radial distance which the ring 70 is positioned on the face 66 of the disc from the axis of the drive shaft 47 will determine the linear movement transferred from the disc through the ring to the cylindrical surface of the driven cylinder 53. The further the ring is from the axis of the drive shaft, the greater will be the rotation of the cylinder, and conversely, the nearer the ring is to the axis of the drive shaft, the less the driven cylinder will be rotated. Thus, it will be seen that the assemblage of the disc, ring and cylinder provides a variable speed or motion transmission or integrating mechanism for two variables, which are the rotation of the drive shaft 47 and the position of the ring 70.

Since the floating ring may move radially of the disc and longitudinally of the cylinder, or sideways of the ring, between the parallel surfaces of the disc and cylinder, it is necessary that some means be provided for positioning the ring. Therefore, a ring guide or actuator member 80 having an elongate longitudinally extending slot 81 is disposed on the side of the cylinder opposite the disc, with the ring 70 engaged in the slot 81 as clearly shown in Figures 1, 2 and 4. The ring guide has an opening 82 at its outer end which is connected to the actuating link 44 from the temperature actuated Bourdon spirals, whereby movement of the link by the operating arm 43 will swing the outer end of the ring guide to dispose the ring at an angle to the longitudinal axis of the cylinder so that the ring is disposed at a slight angular attitude with respect to the surface of the cylinder, and the rolling engagement of the ring with the cylinder causes the ring to migrate laterally in the direction of the force applied by the ring guide to a new position longitudinally of the cylinder. The force is applied on the side of the ring which is moving toward the surface of the disc as the disc rotates. The slot in the ring guide is such that the ring may freely roll in the slot but has a sufficiently close fit to cause the angular movement of the ring without the necessity of an undue movement of the ring guide. Obviously, the shorter the distance between the hole 82 and the ring 70, the less movement is required to swing the ring with respect to the cylinder and cause the same to move to a new position between the disc and cylinder.

As shown in Figures 1 through 4, the ring guide may be guided in its movements and held against a tilting movement around the periphery of the cylinder by means of a plurality of guide bars or rods 85 extending between the arms of the frame and positioned in a plane parallel to the surface 66 of the disc, one of which is disposed in substantial alignment with the drive shaft 47 and the axis of the driven shaft 54. Obviously, the rods will prevent swinging movement of the ring guide around the surface of the cylinder 53.

It will be seen that the integrating device provides a coupling means between a rotational output type of instrument, such as a rotating vane water meter or other fluid meter, or a time or revolution measuring device, such as a clock motor or the like, and a variable which produces a linear or angular movement, such as the temperature responsive means provided by the Bourdon spirals. The output of the rotary movement producing instrument may be constant or variable, and when transmitted through the variable transmission device will be integrated with the movement produced by the linear or angular motion producing variable to provide an integrated motion delivered by the driven shaft 54 for recording or indicating on the totalizer 32.

Obviously, the output from the driven shaft 54 may be used to drive the drive shaft of a second integrator mechanism having a third variable imposed on the movable ring to provide further integration of more than two variables.

Various other means than the ring guide 80 may be used for causing the floating ring 70 to shift to position between the disc and the cylinder. For example, in Figure 6 the ring is shown to be guided by an elongate slide rod 90 having an annular groove 91 in its surface in which the outer periphery of the ring engages. The rod is slidable longitudinally through a suitably positioned aperture 92 in the arm 51a of the frame and when slid longitudinally will tilt the ring 70 in the same manner as the ring guide 80 previously described to shift the position of the ring between the disc and cylinder.

Figures 8 and 9 show a still further modification wherein a swingable arm 95 is provided with a guide fork 96 having a notch 97 in its end which engages the sides of the ring 70 to cause the ring to shift positions between the cylinder and disc.

Figures 10 through 13 illustrate means providing indirect coupling between the ring and the actuator for producing the shifting movement of the ring between the cylinder and the disc. In Figures 10 and 11, an elongate actuator arm 100 has a magnet 101 mounted on an inturned fork-like arm 102, and the magnet attracts the ring and causes the ring to follow as it shifts in position. The fork-like arm 102 is adapted to engage the ring to prevent the magnet from being drawn away from the ring without moving the same in the event a sudden large movement of the actuator arm occurs.

In Figures 12 and 13 the actuator arm 105 has a very strong magnet 106 on its outer end positioned to act on the outer end of a ring guide 107 similar to the ring guide 80 previously described. The ring guide 107 may have the end adjacent the magnet 106 magnetized and of opposite polarity so that there is a strong attraction between the magnet 106 and the end of the ring guide 107. Thus, when the actuator arm 105 is positioned, the magnet 106 will be moved laterally with respect to the surface of the disc and will swing the ring guide 107, causing the ring 70 to follow the guide and shift position between the cylinder and disc. With this type of installation, the disc, cylinder, ring and ring guide may be entirely enclosed in a sealed case 110 since no direct connection is needed between the actuator arm 105 and the ring guide.

Obviously, other means for actuating or shifting the position of the ring between the disc and cylinder may be used if desired, the purpose of any such means being to position the floating ring at a distance from the center of the rotating disc determined by the movement of an actuating device producing a lateral or angular movement.

It will further be seen that the floating ring 70 may incorporate many various configurations or structures in cross-section. A number of possible structures are illustrated in Figures 14 through 19, inclusive, wherein the outer periphery of the ring provides for a substantial linear contact with one member, while the inner periphery of the ring provides for two or more spaced points of contact disposed to each side of the contact provided by the outer periphery.

As shown in Figure 20, it is entirely possible to obtain the same result as mentioned above by using a driving member or driven member which is conical in shape without departing from the spirit of the invention. Figure 20 illustrates the use of a cone 120 as driving member and a cylinder 121 as a driven member, with the floating ring 122 interposed between them. As the cylinder turns on its axis, it engages the floating ring, which in turn engages the cone which may be designed to receive and transmit its resulting motion by way of a shaft extending from the cone in any desired direction, according to the application of the invention. Obviously, this system may be reversed to the effect that the cone may be the driving member and the cylinder, the driven member.

Figure 20 adapts itself readily to increasing or decreasing the mechanical advantage between the driving and driven members for any given position of the floating ring, said floating ring being adjustable and capable of being positioned at any location between the parallel surfaces of the driving and driven members.

Furthermore, as shown in Figures 21 through 23, the ring 122 may be formed with the single point or line of contact on the inner periphery with the two or more spaced points of contact on the outer periphery of the ring.

The foregoing description of the invention is explanatory only, and changes in the details of the constructions illustrated may be made by those skilled in the art, within the scope of the appended claims, without departing from the spirit of the invention.

What we claim and desire to secure by Letters Patent is:
1. A variable speed transmission device including: a support; a driving member rotatable about a fixed axis on the support; a driven member rotatable about a second fixed axis on said support, each of said driving and driven members having a surface disposed parallel to the surface of the other of said driving and driven members in a plane common to the axes about which said members are rotatable; one of said members having its surface varying in distance from the axis of rotation of said member; the other of said members being a cylinder, means urging said members toward each other, a ring clamped between said members and encircling one of the members, said ring frictionally engaging said members whereby movement of the driving member is transmitted to said ring and through said ring to the driven member, said ring being shiftable radially with respect to the axis of said one of said members to vary the movement of the driven member in response to the movement of the driving member, said ring engaging said one of said members at substantially a single point and the other of said members at a plurality of axially spaced points lying in plane parallel to the axis of rotation of said other of said members.

2. A variable speed transmission device of the character set forth in claim 1 wherein: the surface of said member having its surface varying in distance from the axis of rotation of said member is planar and normal to said axis of rotation.

3. A variable speed transmission device including: a support; a drive shaft rotatably carried by the support; a drive disc fixedly carried by said drive shaft and rotatable therewith; a driven shaft rotatably mounted on said support and having its axis parallel with the surface of the disc and spaced therefrom; a driven cylinder secured on the driven shaft and having the elements of its cylindrical surface disposed parallel to the planar surface of the disc; an annular member having a bore substantially larger than the driven member and disposed surrounding said driven member and to engage the planar surface of the drive disc; and means biasing said disc toward said cylinder to resiliently grip the annular member therebetween, whereby rotation of the drive shaft rotates the disc and the annular member by reason of its engagement with said disc and said cylinder transmits movement from said disc to said cylinder to turn said cylinder and rotate the driven shaft on which same is mounted; said annular member contacting said drive disc at substantially a single point and said cylinder at two axially spaced points; said single point being disposed relatively intermediate said two points; and said annular member being shiftable in position longitudinally of the cylinder and radially of the disc to provide varying ratios of movement of the cylinder with respect to the disc.

References Cited in the file of this patent

UNITED STATES PATENTS

| | | |
|---|---|---|
| 808,150 | Fristoe | Dec. 26, 1905 |
| 918,176 | Lory | Apr. 13, 1909 |
| 1,032,183 | Buchan | July 9, 1912 |
| 1,088,280 | Hottinger | Feb. 24, 1914 |
| 1,277,371 | Boyle et al. | Sept. 3, 1918 |
| 2,297,435 | Schwager | Sept. 29, 1942 |
| 2,444,470 | Richardson | July 6, 1948 |
| 2,555,748 | Coningsby et al. | June 5, 1951 |

FOREIGN PATENTS

| | | |
|---|---|---|
| 579,345 | France | July 30, 1924 |
| 263,693 | Switzerland | Dec. 1, 1949 |